United States Patent Office 3,415,817
Patented Dec. 10, 1968

3,415,817
BACTERIA-INHIBITING STEROIDS AND METHOD
OF MAKING THE SAME
Rainer Philippson, Lippe, Gerhard Hempel, Lunen,
Emanuel Kaspar, Kamen, and Armin Karl Wilhelm Kutzsche, Darmstadt, Germany, assignors to
Scherling Aktiengesellschaft, Berlin, Germany
No Drawing. Filed Mar. 2, 1965, Ser. No. 436,646
30 Claims. (Cl. 260—239.5)

ABSTRACT OF THE DISCLOSURE

A compound of the pregnane series having the general formula

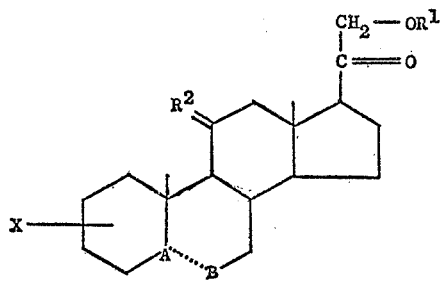

wherein $R^1$ is a member selected from the group consisting of hydrogen and a $-CO-(CH_2)_n-Y$ radical, $n$ herein being a number from 1 to 6 and Y being hydrogen, chlorine or aliphatic or heterocyclic amine, and wherein $R^2$ is a member selected from the group consisting of

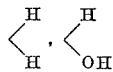

and $=O$, and wherein X represents one or two carbon-to-carbon double bonds and A . . . . . B is a

or $C=C$ group.

An example of the compounds of the invention is $\Delta^3$-5$\beta$-pregnene-21-ol-20-one-21-hemisuccinate.

The compounds have a strong bacteria-inhibiting action.

---

The present invention relates to pregnane type compounds of the general formula

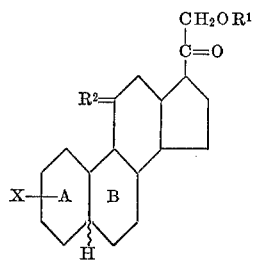

wherein $R^1$ is a member selected from the group consisting of hydrogen and acyl, $R_2$ is a member selected from the group consisting of

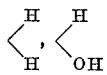

and $=O$ and wherein X is at least one carbon to carbon double bond in ring A. The rings A and B in this formula may be fused either cis or trans at $C_5$.

These novel compounds are obtained by modifying certain pregnane type compounds wherein an $\alpha$ or $\beta$ oriented hydroxyl group is attached in the usual manner at position 3 and wherein H in position 5 is likewise $\alpha$ or $\beta$ oriented. It has not been known, so far as we are aware, that any of these starting products which have a ring-attached oxygen may have an inhibitory effect on bacteria. According to the applicants own experimental findings such action is present in these compounds only to a minor extent.

It is therefore an object of the present invention to obtain pregnane type compounds which have a strong inhibitory effect on bacteria.

It is a further object of the present invention to develop such bacteria inhibiting compounds by commercially feasible processes from the mentioned starting products.

Under another aspect it is an object of the present invention to produce steroids which are useful as intermediates for the production of other desired steroids and, more particularly, to produce such intermediate compounds the usefulness of which is based on an unsaturation in the A ring which lends itself to easy hydration.

These and other objects of the invention will be apparent from the following description.

The products of the invention which have the formula as above stated are obtained by starting from pregnane type compounds of the following structure wherein $R^1$ and $R^2$ have the same meaning as above indicated:

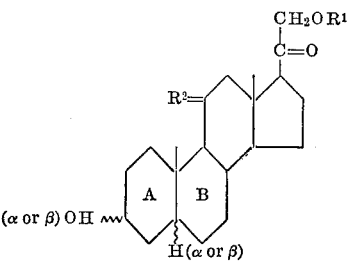

Our first step in the process of manufacture is the elimination in a manner known per se of the hydroxyl group which may be $3\alpha$ or $3\beta$ oriented. This may be accomplished by treating the starting product directly with a water eliminating means, preferably phosphoryl chloride. Another process is to convert the compound first into a 3-sulfonic acid ester, preferably the p-toluene sulfonic acid ester whereupon toluene sulfonic acid is eliminated from the thus formed tosylate. In this manner a pregnene type compound which is unsaturated in ring A is obtained which, depending on the desired group to be introduced in $R^1$, may then be subjected to saponification and if desired re-esterification of the OH group.

The re-esterification is of particular value where $R^1$ in the final product is the acyl portion of an ionic ester group of the type

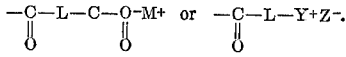

L in these last two formulas is a member selected from the group consisting of $-(CH_2)_n-$, $-O-(CH_2)_n-$ and $-NH-(CH_2)_n-$ and $n$ is an integer between 1 and 6, $M^+$ is a cation such as $Na^+$, $K^+$ or $NH_4^+$. Y in the last formula is a functional ammonium group formed with hydrogen, alkyl, hydroxyalkyl, hydrocarbon carboxyalkyl, aminoalkyl, aryl or aralkyl wherein there are present up to 10 carbon atoms and $Z^-$ is a pharmacologically acceptable anion. The following table shows a compilation of various tests made in vitro (using horsemeat broth) to determine the minimum effective inhibition concentration (μg/ml.) of various hemisuccinate-sodium salts in their effectiveness against staphyllococcus aureus SG 511.

| Compound: | Inhibitory concentration |
|---|---|
| 5β-pregnane-3α, 21-diol-20-one - 21 - hemisuccinate-Na | 160 |
| Δ³-5β-pregnene - 21 - ol - 20 - one-21-hemisuccinate-Na | 16 |
| 5α-pregnane-3β,21-diol-20-one - 21 - hemisuccinate-Na | 200 |
| Δ² - 5α - pregnene-21-ol-20-one-21-hemisuccinate-Na | 16 |
| Δ² - 5α - pregnene-21-ol-20-one-21-piperidinoacetate-hydrochloride | 5 |
| Δ³,⁵-pregnadiene-21-ol-20-one - 21 - hemisuccinate-sodium | 8 |

Tests were furthermore made with various diethylamino acetates in the form of their hydrochlorides to determine the minimum inhibitory concentration (μg/ml.) against candida albicans in Schraufstätter-soluion.

| Compound: | Inhibitory concentration |
|---|---|
| Δ² - 5α - pregnene-21-ol-20-one-21-diethylaminoacetate-hydrochloride | 6.4 |
| Δ³,⁵ - pregnadiene-21-ol-20-one-21-diethylaminoacetate-hydrochloride | 13 |

The following examples will illustrate the invention more specifically:

EXAMPLE 1

(a) 5.0 g. of 5β-pregnane-3α,21-diol-20-one-21-acetate and 5 g. toluene sulfochloride are dissolved in 69 ml. dry pyridine and are left for 24 hours on the shelf at room temperature. The reaction product is then stirred into 4 l. ice water and is extracted with methylenechloride. The organic phase is thereupon washed with dilute sulfonic acid, a sodium carbonate solution and water, is then dried over sodium sulfate and concentrated. After recrystallization from acetone there is obtained 5.5 g. 5β-pregnane-3α,21-diol-20-one-3α-tosylate-21-acetate, M.P. 156–158° C. 6.3 g. of this compound are then dissolved in 53 ml. collidine and refluxed for 3 hours. Thereupon precipitation is effected in ice water to which is added a small amount of hydrochloric acid followed by extraction with ether, drying and concentration over sodium sulfate. The thus obtained crude product is dissolved in benzene and passed through a filter column in which there is placed 10 times the amount of silica gel containing 10% water. After concentration there is obtained 4.0 g. Δ³-5β-pregnene-21-ol-20-one-21-acetate which melts after recrystallization from hexane at 80–81° C.

(b) 4.0 g. of Δ³-pregnene-21-ol-20-one-21-acetate and 1.4 g. of potassium acetate are dissolved in 500 ml. methanol and refluxed for 3 hours. Thereafter concentration is effected to one-third of the volume by means of vacuum and then reaction with 6 times the amount of water. Extraction takes place with methylene chloride followed by drying over sodium sulfate and concentration up to dryness. There is obtained 3.0 g. of Δ³-5β-pregnene-21-ol-20-one.

(c) 3.0 g. of Δ³-5β-pregnene-21-ol-20-one and 3.0 g. of succinic anhydride are dissolved in 25 ml. pyridine and are left on the shelf for 16 hours at room temperature. The reaction product is afterwards put in ice water, acidified with hydrochloric acid and extracted with methylene choride. The washing is effected with dilute hydrochloric acid and water followed by drying over sodium sulfate and concentration up to complete dryness. After recrystallization from ether there are obtained 2.1 g. of Δ³-5β-pregnene-21-ol-20-one - 21 - hemisuccinate, M.P. 148.5–150° C.

The sodium salt is obtained by freeze drying of the aqueous sodium salt solution.

EXAMPLE 2

(a) 5α-pregnane-3β,21-diol-20-one-3β-tosylate-21-acetate is obtained in a manner similar to that of example 1 from 6.6 g. of 5α-pregnane-3β,21-diol-20-one-21-acetate and 6.6 g. p-toluene sulfochloride. In this manner there is obtained an amount of 6.5 g. having a melting point of 171–174° C. Likewise similar to Example 1 6.2 g. of this compound are then treated with collidine. By recrystallization from diisopropyl ether 3.6 f. Δ²-5α-pregnene-21-ol-20-one-21-acetate having a melting point of 176–177.5° C. are obtained.

(b) 5.0 g. Δ²-5α-pregnene-21-ol-20-one-21-acetate, 1.7 g. potassium acetate (freshly melted) and 600 ml. methanol are heated and refluxed 5 hours under nitrogen. The product is then concentrated to one-third of its volume in vacuo and the concentrate is stirred into 1.2 l. ice water. The precipitate is removed by suction and is washed and dried. There are obtained 4.3 g. of Δ²-5α-pregnene-21-ol-20-one.

(c) 4.3 g. of Δ²-5α-pregnene-21-ol-20-one and 4.3 g. of succinic acid anhydride are reacted similar to Example 1(c) with 40 ml. pyridine and then subjected to further processing. By recrystallization from diisopropyl ether there are obtained 2.8 g. of Δ²-5α-pregnene-21-ol-20-one-21-hemisuccinate, M.P. 120–123° C. The sodium salt is obtained by freeze drying of the aqueous sodium salt solution.

(d) 0.500 g. Δ²-5α-pregnene-21-ol-20-one are dissolved in 5 ml. pyridine and to this is added by dropper and upon ice cooling 0.294 g. chloroacetic acid anhydride in 3 ml. ether. Thereafter the product is subjected to stirring for 15 minutes and simultaneous warming to room temperature. Thereafter 0.1 ml. water are added and the product is stirred into 80 ml. ice water. The precipitate, Δ²-5α-pregnene-21-ol-20-one-21-chloroacetate is removed by suction and consecutively washed with 20 ml. each of water, 2 N HCl, water, a 2% solution of NaHCO₃H and water. After drying there is obtained 0.550 g. in vacuo.

(e) 0.550 g. Δ²-5α-pregnene-21-ol-20-one-21-chloroacetate are dissolved in 8 ml. tetrahydrofurane and 0.220 g. diethylamine in 8 ml. tetrahydrofurane are added. After a reaction time of 16 hours at 50° C. the precipitated diethylamine hydrochloride is removed by suction and the filtrate is concentrated in vacuo to dryness. The thus obtained crude product is dissolved in 20 ml. ether. Hydrochloric acid is added to this solution upon cooling with ice and stirring. The excess hydrochloric acid is removed by flushing out with nitrogen at room temperature and the precipitated Δ²-5α-pregnene-21-ol-20-one-21-diethylamino-acetate hydrochloride is then removed by suction. After drying there is obtained 0.250 g. of this product with a melting point of 184–186° C.

(f) From 0.500 g. Δ²-5α-pregnene-21-ol-20-one-21-chloroacetate and 0.215 g. piperidine there are obtained in a manner similar to Example 2(e) 0.430 g. Δ²-5α-pregnene-21-ol-20-one-21-piperidinoacetate-hydrochloride having a melting point of 159–161° C. (disintegrated).

(g) From 0.500 g. Δ²-5α-pregnene-21-ol-20-one-21-chloroacetate and 0.240 g. morpholine there is obtained in a manner similar to Example 2(e) 0.280 g. of Δ²-5α-pregnene-21-ol-20-one-21-morpholinoacetate - hydrochloride having a melting point between 176 and 177° C.

EXAMPLE 3

1.42 g. Δ³-pregnene-21-ol-20-one-21-hemisuccinate obtained as in Example 1(c) are hydrated in 60 ml. acetic acid ester in the presence of 0.284 g. palladium/charcoal. After taking up the calculated amount of hydrogen the product is removed by filtration from the catalyst and concentrated in vacuo to dryness. The obtained crude product is boiled with hexane, then removed by suction after cooling, then washed several times with hexane and dried. There are thus obtained 1.40 g. 5β-pregnane-21-ol-20-one-21-hemisuccinate of a melting point of 119–121°

C. The sodium salt is obtained by freeze drying of the aqueous sodium salt solution.

EXAMPLE 4

(a) 3.0 g. of $\Delta^2$-pregnene-21-ol-20-one-21-acetate obtained as in Example 2(a) are dissolved in 420 ml. acetic acid ester and are hydrated over 0.150 g. platinum oxide. After taking up of 1 mole hydrogen the hydration is discontinued, the catalyst is removed by filtration and the product is dry-concentrated. By recrystallization from acetone there is obtained 2.3 g. 5α-pregnane-21-ol-20-one-21-acetate, M.P. 198.5–199° C.

(b) 2.11 g. 5α-pregnane-21-ol-20-one-21-acetate and 735 mg. of potassium acetate are refluxed in 250 ml. methanol for 6 hours in a nitrogen atmosphere. Thereafter the product is concentrated to one-third of its volume and the concentrate is poured into 500 ml. ice water. The precipitated 5α-pregnane-21-ol-20-one is removed by suction, washed and dried.

(c) 0.670 g. of 5α-pregnane-21-ol-20-one are dissolved in 4 ml. pyridine and to this is added by dropping and while cooling in ice 0.475 g. of chloroacetic acid anhydride in 6 ml. ether. Thereafter the product is stirred for 15 minutes with warming up to room temperature. 0.1 ml. water are then added and the product is added upon stirring to 100 ml. ice water. The precipitate, 5α-pregnane-21-ol-20-one-21-chloroacetate is removed by suction and successively washed with 25 ml. each of water, 2 N HCl, water, 2% NaHCO$_3$ solution and water. After drying in vacuo the yield is 0.700 g.

(d) 0.700 g. of 5α-pregnane-21-ol-20-one-21-chloroacetate are dissolved in 10.5 ml. tetrahydrofurane and to this are added 0.302 g. diethylamine in 10.5 ml. tetrahydrofurane. After 20 hours at room temperature the precipitated diethylamine hydrochloride is removed by suction and the filtrate is concentrated to dryness in vacuo. The thus obtained crude product is dissolved in 20 ml. ether and hydrochloric acid is added to the solution upon cooling by ice and stirring. The excess hydrochloric acid is removed by flushing with nitrogen at room temperature and the precipitated 5α-pregnane-21-ol-20-one-21-diethylaminoacetate-hydrochloride is then removed. After drying there is obtained 0.44 g., M.P. 194—196° C.

(e) 1.8 g. 5α-pregnane-21-ol-20-one obtained as in Example 4(b) and 1.79 g. succinic acid anhydride are reacted with 20 ml. pyridine in a manner similar to Example 3. After recrystallization from diisopropyl ether there are obtained 1.9 g. 5α-pregnane-21-ol-20-one-21-hemisuccinate, M.P. 159–161° C.

The sodium salt is obtained by dry freezing.

EXAMPLE 5

7.8 g. 5α-pregnane-3β,21-diol-20-one-21-acetate and 15.5 g. phosphorpentoxide are refluxed for 3 hours in 500 ml. benzene. The reaction product after cooling is reacted with 500 ml. ether and stirred into 1 l. ice water. The organic phase is then separated and the aqueous phase is shaken 5 times with 100 ml. each of ether. These several ether extractions are then united with the main body of the organic phase, are washed with water, dried over sodium sulfate and under reduced pressure concentrated to dryness. After recrystallization of the residue from isopropyl ether thee is obtained 3.55 g. $\Delta^2$-5α-pregnene-21-ol-20-one-21-acetate, M.P. 176–177.5° C.

EXAMPLE 6

(a) 1.2 g. $\Delta^{3,5}$-pregnadiene-21-ol-20-one-21-acetate and 420 ml. potassium acetate are dissolved in 144 ml. methanol and are refluxed for 4 hours in a nitrogen atmosphere. The major portion of the methanol is then removed in vacuo by distillation and the concentrate is stirred into ice water. The organic phase is taken up in methylene chloride, is washed with water, dried over sodium sulfate and concentrated in vacuo. After recrystallization from isopropyl ether there is obtained 940 mg. of $\Delta^{3,5}$-pregnadiene-21-ol-20-one, M.P. 154–155° C., UV: $\epsilon_{228}$=18800, $\epsilon_{235}$=20000.

(b) A freshly prepared solution of 294 mg. of chloroacetic acid anhydride in 3 ml. absolute ether is added by dropping to 500 mg. $\Delta^{3,5}$-pregnadiene-21-ol-20-one in 5 ml. pyridine upon stirring, cooling in ice and in a nitrogen atmosphere. After 15 minutes of stirring and warming up to room temperature 0.1 ml. water are added. After further stirring for 5 minutes the reaction product is added to 100 ml. water and the formed precipitate is removed by suction. The product is then washed successively with 15 ml. each of water, 5% hydrochloric acid, water, 2% sodium bicarbonate solution and water. Thereafter drying is effected at 50° C. The thus obtained $\Delta^{3,5}$-pregnadiene-21-ol-20-one-21-chloroacetate is further processed without further purifying as described below under (c).

(c) 550 ml. crude $\Delta^{3,5}$-pregnadiene-21-ol-20-one-21-chloroacetate are dissolved in 8 ml. tetrahydrofurane, reacted with a solution of 200 ml. diethylamine in 8 ml. tetrahydrofurane and are heated for 16 hours to 50° C. The resulting diethylamine hydrochloride is removed by suction after cooling and the filtrate is concentrated and dried. There are obtained 600 mg. crude $\Delta^{3,5}$-pregnadiene-21-ol-20-one-21-diethylaminoacetate which is dissolved in 20 ml. absolute ether. The ether solution is thereafter saturated with hydrochloric acid while cooling in ice. The excess hydrochloric acid is removed by flushing with nitrogen and the precipitated $\Delta^{3,5}$-pregnadiene-21-ol-20-one-21-diethylaminoacetate hydrochloride is removed by suction. This product melts after treatment with isopropyl ether at 182.5–184° C. (disintegrated). UV: $\epsilon_{228}$=18200; $\epsilon_{234}$=19200; yield 490 mg.

(d) 400 mg. of $\Delta^{3,5}$-pregnadiene-21-ol-20-one and 400 mg. of succinic acid anhydride in 5 ml. pyridine are left on the shelf for 16 hours at room temperature. The reaction product is then stirred into 50 ml. ice water, is acidified with hydrochloric acid, the precipitate is removed by suction, washed with water and dried. After recrystallization from acetic acid ester there is obtained 340 mg. $\Delta^{3,5}$-pregnadiene-21-ol-20-one-21-hemisuccinate, M.P. 139–140.5° C; UV: $\epsilon_{228}$=17900, $\epsilon_{233}$=19300.

The sodium salt is obtained by freeze drying of the aqueous sodium salt solution.

EXAMPLE 7

(a) Analogous to Example 1(a) 1.4 g. of $\Delta^2$-5α-pregnene-11β,21-diol-20-one-21-acetate are obtained from 2.5 g. 5α-pregnane-3β,11β,21-triol-20-one-21-acetate and 3.35 g. p-toluene sulfochloride which intermediately is converted to 2.8 g. 5α-pregnane-3β,11β,21-triol-20-one-3β-tosylate-21-acetate (M.P. 157–159° C).

The final product after recrystallization from isopropyl ether has a melting point of 145–153.5° C.

(b) 600 mg. $\Delta^2$-5α-pregnene-11β,21-diol-20-one-21-acetate, 218 mg. potassium acetate (freshly molten) and 75 ml. methanol are refluxed for 3 hours in a nitrogen atmosphere. The volume is thereafter concentrated in vacuo to one-third and precipitation is effected in ice water. The precipitate is removed by suction, washed and dried. There are obtained 500 mg. $\Delta^2$-5α-pregnene-11β,21-diol-20-one.

(c) 220 mg. $\Delta^2$-5α-pregnene-11β,21-diol-20-one are dissolved in 2 ml. pyridine and to this 440 mg. chloroacetic acid anhydride in 5 ml. ether are added in drops while cooling in ice. After 4 hours in ice the reaction product is added to 50 ml. ice water and extracted with ether. The extracted ether solution is successively washed with water, 5% hydrochloric acid, water, 2% NaHCO$_3$ solution and again in water and is dried over Na$_2$SO$_4$. After evaporation of the solvent up to complete dryness the residue is taken up in benzene and subjected to chromatographical separation over 100 times its amount of silica gel (10% water). By means of a benzene/methylene chloride mixture in the ratio of 1:1 120 mg. $\Delta^2$-5α-pregnene-11β,21-diol-20-one-21-chloroacetate are obtained by elution.

(d) 10 mg. diethylamine in 2 ml. dioxane are added to a solution of 120 mg. Δ²-5α-pregnene-11β,21-diol-20-one-21-chloroacetate in 4 ml. absolute dioxane. After a reaction time of 44 hours at 50° C. the precipitated diethylamine hydrochloride is removed by suction and the filtrate is dried in vacuo by concentration. The obtained crude product is purified by dissolving it in 10 ml. ether and is precipitated with an ether solution of hydrogen chloride. There are thus obtained 80 mg. Δ²-5α-pregnene-11β,21-diol-20-one-21-diethylaminoacetate which after washing it again with cooled ether melts at 203–208° C.

EXAMPLE 8

(a) 3.59 g. Δ²-5α-pregnene-21-ol-20-one-21-acetate are reacted in 300 ml. ether with 2.55 g. osmium tetroxide in 300 ml. ether and are left on the shelf for 4 days at room temperature. Thereafter the product is concentrated to dryness and the residue is heated for 4 hours with 40 g. sodium metabisulfite in aqueous methanol. The solvent is removed by distillation and the residue is treated with methylene chloride. There are obtained 3.4 g. crude 5α-pregnane-2α,3α,21-triol-20-one-21-acetate which after filtration over 25 times its amount of silica gel by means of a benzene-chloroform mixture (1:1 ratio) and recrystallization from acetic acid ester has an M.P. of 226.5–228° C.

(b) 2.35 g. of 5α-pregnane-2α,3α,21-triol-20-one-21-acetate, 7.05 g. of p-toluene sulfochloride and 40 ml. pyridine are heated for 64 hours to 60° C. Further processing takes place in the manner described in Example 1(a). After chromatographical separation and recrystallization from acetone there is obtained 1.85 g. of 5α-pregnane-2α,3α,21-triol-20-one-2,3-ditosylate-21-acetate, M.P. 189–190.5° C. 1.28 g. 5α-pregnane-2α,3α,21-triol-20-one-2,3-ditosylate-21-acetate are dissolved in 16 ml. collidine and refluxed for 65 hours. The subsequent processing takes place in accordance with Example 1(a). After passing through a filter column and recrystallization from diisopropyl ether there is obtained 0.348 g. of Δ¹,³-5α-pregnadiene-21-ol-20-one-21-acetate, M.P. 166–167° C. UV: $\epsilon_{264}$=4800.

(c) 300 mg. Δ¹,³-5α-pregnadiene-21-ol-20-one-21-acetate are saponified in the manner shown in Example 6(a) whereby Δ¹,³-5α-pregnadiene-21-ol-20-one is obtained.

(d) 120 mg. crude Δ¹,³-5α-pregnadiene-21-ol-20-one as obtained in Example 8(c) are reacted in the manner described in Example 6(d) so as to obtain Δ¹,³-5α-pregnadiene-21-ol-20-one-21-hemisuccinate. UV: $\epsilon_{264}$=4800.

*Analysis.*—Calculated: C, 72.43; H, 8.27; O, 19.30. Found: C, 72.57; H, 7.98; O, 19.10.

The sodium salt is obtained by freeze drying of the aqueous sodium salt solution.

(e) 120 mg. crude Δ¹,³-5α-pregnadiene-21-ol-20-one as obtained in Example 8(c) are reacted in the manner described in Example 6(b) to obtain Δ¹,³-5α-pregnadiene-21-ol-20-one-21-chloroacetate.

(f) The Δ¹,³-5α-pregnadiene-21-ol-20-one - 21 - chloroacetate as obtained in Example 8(e) is reacted in the manner described in Example 6(c) to obtain Δ¹,³-5α-pregnadiene - 21-ol-20-one-21-diethylaminoacetatehydrochloride. UV: $\epsilon_{264}$=4800; M.P. 194–195° C.

*Analysis.*—Calculated: Cl, 7.64; N, 3.02. Found: Cl, 7.99; N, 3.11.

While these examples have been furnished to illustrate the invention we do not wish to be limited thereby in any way other than by the language of the following claims.

What we claim is:

1. A compound of the pregnane series having the general formula

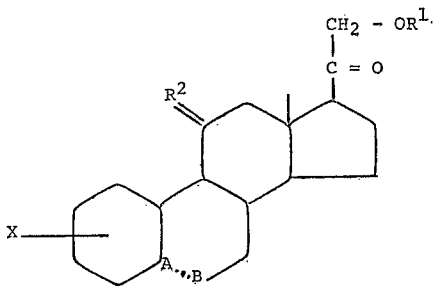

wherein $R^1$ is a member selected from the group consisting of hydrogen and a —CO—$(CH_2)_n$—Y radical, $n$ herein being a number from 1 to 6 and Y being hydrogen, chlorine or carboxyl or a

group wherein $Z_1$ and $Z_2$ may be the same or different and are lower alkyl, or wherein $Z_1$ and $Z_2$ together with N form a 6 member heterocyclic residue that may contain an oxygen atom in addition to N, and wherein $R^2$ is a member selected from the group consisting of

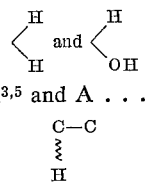

Δ² or Δ³ or Δ¹,³ or Δ³,⁵ and A . . . . B is a

or C=C group.

2. The compound of claim 1 wherein rings A and B are cis-fused at $C_5$.
3. The compound of claim 1 wherein rings A and B are trans-fused at $C_5$.
4. The compound of claim 1 wherein $R^1$ is acetyl.
5. The compound of claim 1 wherein $R^1$ is the half-esther residue of a succinic acid ester.
6. The compound of claim 1 wherein $R^1$ is diethylamino acetyl.
7. Δ³-5β-pregnene-21-ol-20-one-21-hemisuccinate.
8. Δ²-5α-pregnene-21-ol-20-one-21-hemisuccinate.
9. Δ²-5α-pregnene-21-ol-20-one-21-piperidinoacetate.
10. Δ³,⁵-pregnadiene-21-ol-20-one-21-hemisuccinate.
11. Δ²-5α-pregnene-21-ol-20-one-21 - diethylaminoacetate.
12. Δ³,⁵-pregnadiene-21-ol-20 - one - 21 - diethylaminoacetate.
13. Δ³-5α-pregnene-21-ol-20-one-21-acetate.
14. Δ³-5α-pregnene-21-ol-20-one.
15. Δ²-5α-pregnene-21-ol-20-one-21-acetate.
16. Δ²-5α-pregnene-21-ol-20-one.
17. Δ³,⁵-pregnadiene-21-ol-20-one-21-chloroacetate.
18. Δ³,⁵-pregnadiene-21-ol-20-one.
19. Δ²-5α-pregnene-11β,21-diol-20-one-21-acetate.
20. Δ¹,³-5α-pregnadiene-21-ol-20-one-21-acetate.
21. A process of making a compound of the pregnane series having the general formula

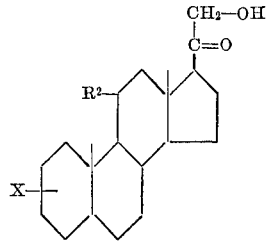

wherein $R^2$ is a member selected from the group consisting of

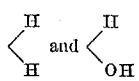

and wherein X represents $\Delta^2$ or $\Delta^3$ or $\Delta^{1,3}$ or $\Delta^{3,5}$, comprising the step of subjecting a compound of the general formula

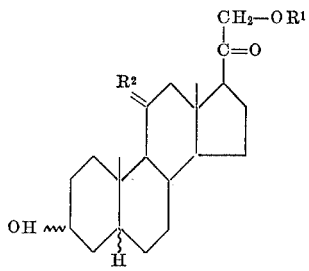

wherein $R^1$ is a $-CO-(CH_2)_n-Y$ radical, $n$ herein being a number from 1 to 6 and Y being hydrogen, chlorine, carboxyl or a

group wherein $Z_1$ and $Z_2$ may be the same or different and are lower alkyl, or wherein $Z_1$ and $Z_2$ together with N form a 6 member heterocyclic residue that may contain an oxygen atom in addition to N, and wherein $R^2$ has the meaning as above, to the action of phosphoryl chloride whereby the hydroxyl group of the 3-position is eliminated followed by saponification of the resulting product to form the 21-hydroxy compound.

22. The process of claim 21 wherein the 3-hydroxyl group is α-oriented.

23. The process of claim 21 wherein the 3-hydroxyl group is β-oriented.

24. A process of making a compound of the pregnane series of the general formula

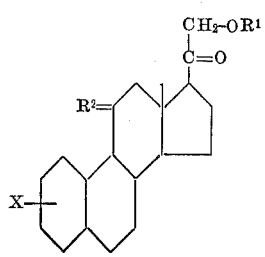

wherein $R^1$ is a $-CO-(CH_2)_n-Y$ radical, $n$ herein being a number from 1 to 6 and Y being hydrogen, chlorine, carboxyl or a

group wherein $Z_1$ and $Z_2$ may be the same or different and are lower alkyl, or wherein $Z_1$ and $Z_2$ together with N form a 5 or 6 member heterocyclic residue that may contain an oxygen atom in addition to N, and wherein $R^2$ is a member selected from the group consisting of

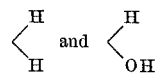

and wherein X represents $\Delta^2$ or $\Delta^3$ or $\Delta^{1,3}$ or $\Delta^{3,5}$, comprising the step of subjecting a compound of the general formula

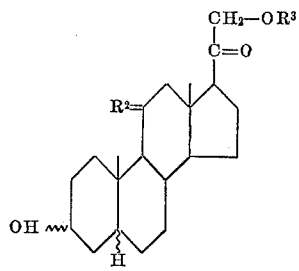

to the action of phosphoryl chloride, $R^2$ in the latter formula having the meaning as above and $R^3$ being a $-CO-(CH_2)_n-Y$ radical, $n$ herein being a number from 1 to 6 and Y being hydrogen, chlorine, carboxyl or a

group wherein $Z_1$ and $Z_2$ together with N form a 6 member heterocyclic residue that may contain another heterocyclic atom in addition to N, with the proviso that $R^3$ is different from $R^1$, whereby the hydroxyl group of the 3-position is eliminated followed by saponification of the resulting product to form the 21-hydroxy compound and subjecting the product to re-esterification to convert the $OR^3$ group to the desired $OR^1$ group.

25. The process of claim 24, wherein the 3-hydroxyl group is α-oriented.

26. The process of claim 24, wherein the 3-hydroxyl group is β-oriented.

27. $\Delta^2$ - 5α - pregnene - 21-ol-20-one-21-morpholinoacetate.

28. $\Delta^{1,3}$ - 5α - pregnadiene - 21 - ol-20-one-21-diethylaminoacetate.

29. $\Delta^{1,3}$ - 5α - pregnadiene - 21 - ol-20-one-21-hemisuccinate.

30. $\Delta^{1,3}$-5α-pregnadiene-21-ol-20-one.

References Cited

UNITED STATES PATENTS 3,056,814   10/1962   Bowers et al.

HENRY A. FRENCH, *Primary Examiner.*

U.S. Cl. X.R.

260—239.55, 397.45, 397.47; 167—65